Patented Apr. 25, 1933

1,905,269

REISSUED

UNITED STATES PATENT OFFICE

GEOFFREY PRICE DENTON, OF RICKMANSWORTH, ENGLAND

PROCESS OF PRODUCING EXPANDED RUBBER MATERIAL

No Drawing. Application filed January 21, 1931, Serial No. 510,332, and in Great Britain May 14, 1930.

This invention has reference to improvements in the manufacture and use of expanded rubber material.

The manufacture of expanded rubber by subjecting the "dough", i. e. the rubber or rubber composition, to heat and gas under high pressure has heretofore proved unsatisfactory in that it is found that the expanded material after a comparatively short period of time loses some of its contained gas and therefore is liable to collapse to some extent. Also that if the outer skin formed on the body of the expanded material be punctured or cut the collapsing of the material is accelerated.

For many purposes material possessing these defects is practically useless.

For instance there has been a demand for an efficient substitute for the metal air tanks employed for many years on life boats to ensure their buoyancy (even after shipping considerable volumes of water), because the walls of said tanks are necessarily made very thin and are, therefore, fairly easily punctured and otherwise damaged rendering the tanks wholly or in part useless. Further they are liable to corrosion and owing to the difficulty of access to them for inspection not merely of the front but of the side and rear walls also of these tanks, there is a more or less constant risk—after they have been installed for some time— that one or more of them may be in a useless or nearly useless condition at the time their useful service is most required.

Although it has been suggested or proposed to utilize expanded rubber for buoyancy blocks in life jackets and otherwise they have not met with any practical success, probably for the reason above stated.

It is an object of my invention to produce an expanded rubber material which obviates the defects of any heretofore known and which may be employed inter alia as an efficient substitute for the metal air tanks referred to, although I wish it to be understood that the scope of my invention is not limited to this or any particular use to be made of it.

The material comprising the basic substance of my invention consists of rubber or a rubber composition with any suitable vulcanizing material, which rubber or composition (hereinafter referred to as the "dough") by air or, preferably, an inert gas, has been expanded within successive containers or moulds under heat and pressure.

When comparatively small blocks or articles are to be made, I may treat a blob of suitable dough in successive containers or moulds whereby the desired form is imparted to the finished article. When larger articles are to be made I may make them so that the body of the finished article is divided up by bulkheads of homogeneous skins of material. This result may be attained in any desired suitable manner. For instance I may in a suitable mould or container make a number of comparatively thin slabs, strips or the like of the expanded material, each having an outer homogeneous skin enclosing an inflated cellular body, and from these build up the desired article, which is then subjected in another mould to heat and pressure thereby causing the contracting skins of adjacent slabs to unite so that the article now completely expanded and vulcanized is made to a degree stiff by the bulkhead or bulkheads within its cellular body. Alternatively I may make the slabs or strips or the like in successive containers and then secure them together— should this be desirable—by a suitable adhesive, for instance rubber solution. The slabs or strips may be arranged in regular or irregular strata according to the purpose to which the finished article is to be applied.

The composition of the dough and the temperature and pressure during treatment will depend of course upon various factors.

For some purposes it may be desirable to utilize dough containing a very large proportion of rubber with the necessary amount of sulphur for vulcanization. For reasons of economy, durability or to obtain hardness, colours etc. or to obtain soft material of less elasticity than pure rubber will give when highly expanded, other ingredients may frequently be introduced into the mix or dough, e. g. hydro-carbons, antimony sulphide, magnesium carbonate, dark substitute, white substitute (vulcanized oil), zinc oxide, magnesium oxide and other known suitable material. The expansion may be effected by air or by an inert gas such as nitrogen.

By way of example for producing a hard and rigid expanded rubber material for use as buoyant blocks, I employ a dough consisting of 60% rubber, 25% sulphur, 6% hydro-carbon, 3% calcined magnesia, 1% ceresine wax, and 5% colouring matter. If less than 5% colouring matter be required the percentage of rubber may correspondingly be increased.

I place this dough in a container and insert this in an autoclave to the steam jacket of which I admit steam so that in a period of about 30 minutes a gauge pressure of about 8 lbs. is reached, and I inject an inert gas, such as nitrogen, into the autoclave or gassing cylinder, at a pressure of about 180 atmospheres, to permeate the dough within the container.

The steam will heat the contents to about 113° C. and I maintain this for a period of about 400 minutes. The pressure of the gas will have risen by the heat applied to it.

After the period stated I shut off the steam supply so that the apparatus with its contents will cool down somewhat during a period of about 60 minutes after which I may accelerate the cooling by circulating water through the jacket.

The apparatus may be of simple construction and comprises a steam jacketed gassing cylinder or autoclave capable of withstanding the necessary gas pressure, one end of which is fitted with a detachable door secured by nuts or, alternatively, a breech block may be employed in place of the door. To the cylinder and jacket are connected inlet and outlet pipes for gas and steam and for water circulation, with appropriate valves and pressure gauges.

The apparatus and its contents having cooled down to normal temperature I open the gas valve to permit the gas to escape and having opened the gassing cylinder remove the container and open it so as to remove from it the material which although it had already expanded so as to fill and exert considerable pressure in the container, will at once further expand to about 6 times or a little more its original volume. I then put this expanded material into another container or mold of adequate size and having the desired internal form, and heat this, say, by admitting steam to a jacket around the mould, until in a period of about 15 minutes a gauge pressure of about 85 lbs. is reached, equivalent to a temperature of about 163° C., which I maintain for about 45 minutes. This will cause the material to expand further by pressure of the gas until it has increased to about 13½ times its original volume, and it will have been shaped or moulded to the form of the mould, and its vulcanization will be completed.

The above procedure is adopted when the article to be produced is say, 1½" thick. When an article of greater thickness is to be made I may adopt a similar procedure varying the heat and period according to its mass or I may produce slabs, strips or the like of expanded material as above described with reference to the first container or mould and insert a number of these in suitably arranged fashion in a second mould which I then heat about as above described. The material thereupon further expands and by the heat and pressure of the gas the outer skins of the several strips or the like will be caused to join or unite. The skins of the layers or strips which have become joined constitute bulkheads within the body of the article rendering this more stiff.

Proceeding as above described I am able to provide really efficient buoyant blocks, that is to say blocks of expanded rubber material which will retain almost indefinitely their original gas content; which are of very low specific gravity (a cubic foot made as aforesaid weighing not more than about five pounds or even less per cubic foot); the buoyancy of which is not materially affected even if they be punctured or cut, because only those cells the walls of which have thus been ruptured will admit water; the cellular body of which will neither be disrupted nor caused to collapse if the outer skin be removed; which are not liable to corrosion, and for the production of which very simple apparatus is required. Further, the skin formed on the outside of the article by the two-stage procedure described, is tough and hard and the walls also of the cells are rendered more perfectly gas tight than by any method heretofore proposed. I therefore do not require to provide, as has been proposed, an outer skin of a special material or composition which does not itself retain gas under pressure for producing an outer skin, with the object of rendering the cellular body of the material gas tight. Further, the necessity, according to another prior proposed method of procedure, of carrying out the complete expansion whilst the froth is hot, in order to prevent collapse on further vulcanization, is negatived by the results obtained by the procedure according to my invention, nor do I obtain the whole of the expansion in a subsequent stage.

Material, made according to my invention, intended for buoyancy purposes, such as for life jackets, life boats, etc. has, therefore, an application of the first importance never hitherto employed.

To obtain, in accordance with my invention, a soft resilient expanded material of say 10 lbs. weight per cubic foot, I make a dough by mixing together rubber 55%, sup- phur 3½%; vulcanized oil (Sub) 9%; gold- en antimony 13% (15 to 17% of free sul- phur); ceresine wax 2% and magnesium carbonate 17½%.

Or, to obtain a soft material of less re- silience of say 17 lbs. per cubic foot, I may make the dough by mixing rubber 60%; sulphur 4%; antimony sulphide 14½%; ceresine wax 2½%; magnesium carbonate 19%.

To obtain a finished material of about ¾" thickness and 10 lbs. weight per cubic foot, I heat the dough in a gassing container by steam as before described and maintain this for about 270 minutes. The gas is ad- mitted to the container at a pressure of about 180 atmospheres. The gas pressure, which increases by the heat applied, is main- tained throughout this period and, as in the former case, also during the period of say 60 minutes in which the apparatus with its contents is allowed to cool down and even, if desired, during any further period when by circulating water through the jacket, the cooling is accelerated.

The material thus partly expanded and vulcanized is then introduced to a second container or mould in which it is heated, conveniently as before described by steam which in this instance may be at gauge pres- sure of about 50 lbs., this pressure being at- tained in a period of about 15 minutes and is maintained for a period of about 45 min- utes. The subsequent cooling of the ap- paratus and its contents may be accelerated by circulating water through the jacket as already mentioned.

In some cases it may be desirable to pro- vide an outer covering of linen, canvas, met- al or other suitable material to protect the expanded rubber against abrasion or other abnormal external forces when in use. In such a case I may cut the said material to shape and lay it in the second container or mould in the appropriate position against the top, bottom and/or other face or faces thereof. This material will be made strong- ly to adhere to the rubber material owing to the great pressure with which this is forced against the faces of the mould when the final expansion and completion of the vulcanization are effected. If desired the metal sheets may be made with countersunk perforations so that the rubber material will become anchored thereto, although I have found that for most purposes the rubber material clings sufficiently firmly to the plain metal sheets.

When long strips or sheets of the ex- panded rubber material are required to be made it may not be possible or at any rate convenient to employ moulds or containers having the required dimensions of the fin- ished material in the flat. In such a case I proceed by cutting a strip of the dough to the required dimensions and roll this upon itself. Preferably I place the strip of dough on a strip of linen, canvas or thin metal and roll the two together into a compact roll which I bind round with several layers or turns of canvas, linen, or thin metal to with- stand the pressure. The outer binding lay- ers of material serve in this instance as the container or mould in which the prelimi- nary treatment is effected. It will be neces- sary to coat or smear the strip of linen, canvas, or metal, with grease, French chalk or the like to prevent the rubber material adhering to it. I then place this roll in the gassing chamber and proceed as already de- scribed, the material being gassed and part- ly vulcanized. After this the gassing cham- ber with its contained roll is allowed to cool down, the gas allowed to escape from the chamber, and the roll of material removed. The roll is then unwound and the second step in the process will be carried out ac- cording to the use to which the finished product is to be put. When a long strip or sheet of the finished material is required, the partly expanded and vulcanized sheet or strip is again wound upon itself (with the strip of linen, canvas or thin metal) and an outer binding of several layers or turns of canvas, linen or thin metal, and the roll is then subjected to the action of heat where- by the further expansion and the completion of the vulcanization of the material are ef- fected. When mats or like articles are re- quired to be made, the partly expanded and vulcanized strip or sheet is cut into pieces of smaller strips of appropriate size and shape, and these are placed in suitable moulds, in which, by the application of heat they are further expanded, thereby imparting to them the shape of the mould, and the vul- canization completed.

By effecting the expansion (as distinct from the vulcanization) of the dough in stages, the gassing chamber which has to withstand the high pressure gas may be made of much smaller dimensions than otherwise would be the case. The impor- tance of this will be appreciated when it is realized that not only is the first cost of a comparatively small gassing chamber and apparatus to withstand a pressure of 180 atmospheres very much less than a large chamber and apparatus to withstand the same high pressure, but the maintenance and working charges also are less, all this aid- ing in the cheapening of the finished prod- uct.

The heating chamber or press wherein the final stage of the expansion (as well as the completion of vulcanization) is brought about by the application of heat, is a relatively inexpensive apparatus.

By my invention it is also made readily possible to produce articles having an interior of hard expanded rubber and an outer facing of soft expanded rubber, or vice versa by building up a mass composed of strips or layers of partly expanded and vulcanized material from dough having the necessary different compositions, and then subjecting them together to further heat and pressure as described.

Then again, by my invention the production of bulky articles of expanded rubber material may be expedited in that a number of containers may be employed for producing strips, slabs or blocks of partly expanded and vulcanized material of which a plurality are required to build up each single finished article.

It is to be borne in mind that when thin metal sheets or strips are employed temporarily to separate superimposed layers of the dough, they must be coated as above described to prevent adherences to them of the rubber material, whereas when thin metal sheets are employed to provide an outer protection covering to the finished article, they should be quite clean and free from grease, whereby the adherence of the rubber material to them is ensured. An advantage to be derived from the employment of thin metal sheets or strips between the superimposed layers of the dough during the gassing and vulcanization is that they readily conduct heat to the dough.

If desired any known suitable accelerator may be mixed with the dough whereby the period of the treatment may be reduced. Although I have given details as to times, temperatures and pressures I wish it to be understood that I do not limit myself to these and, further, that these will also vary accordingly as different compositions of dough are employed, and also accordingly as the articles produced are thinner or thicker than hereinbefore mentioned by way of example.

Apart from its use as a buoyant material or for mats and the like already referred to expanded rubber made according to my invention may be employed for many other purposes such for example as insulation for refrigerators, silencers, non-conductors of sound, as a non-absorbent medium and for various purposes in constructional work, and by suitably varying the composition of the dough—as is well understood—the finished articles or products may vary from extreme velvety softness to a hardness comparable with wood.

It will be seen from the description of expanded rubber material made in accordance with my invention that the dough consists of a basic mixture of rubber, sulphur and ceresine wax together with other substances that determine the character of the finished product, that is to say, when a hard finished product is required, hydro-carbon and calcined magnesia may be added to the basic mixture; when a soft resilient finished product is required, vulcanized oil, golden antimony and magnesium carbonate may be added to the basic mixture, whereas when a soft finished product having less resilience is required, antimony and magnesium carbonate may be added to the basic mixture.

In every case the dough is subjected to heat and gas pressure for a period to produce partial vulcanization and expansion, the thus partly vulcanized and expanded material is then cooled down and then further expanded and its vulcanization completed by the application of heat. It is not necessary during the second stage of the process to inject gas into the partly vulcanized and expanded material; the application of heat alone sufficing to bring about its further expansion as well as effecting the completion of the vulcanization.

The steam jacketed chambers or autoclaves, as also the moulds or containers employed in the production of the expanded rubber material according to my invention, are so well known in the art that it is not necessary to illustrate any of them.

What I claim is:—

1. The process of producing expanded rubber material which consists in subjecting the dough to gas under high pressure, effecting partial vulcanization of the dough by heat whilst the dough is in the said gas under high pressure, cooling the dough, releasing the said pressure, and subsequently completing vulcanization and simultaneously expanding the dough by reheating it.

2. The process of producing expanded rubber material which consists in subjecting the dough to gas under high pressure and simultaneously permitting only partial expansion of the dough, effecting partial vulcanization of the dough by heat whilst the dough is in the said gas under pressure, cooling the dough, releasing the said pressure, permitting further expansion of the dough, and finally completing vulcanization and expansion of the dough by a further heat treatment thereof in the absence of gas under high pressure.

3. The process of producing expanded rubber material which consists in subjecting the dough to gas under high pressure, effecting partial vulcanization of the dough by heat whilst the dough is in the said gas under pressure, cooling the dough, releasing the said pressure, permitting further expansion of the dough, and finally completing vulcanization and expansion of the dough by a further heat treatment thereof in the absence of gas under high pressure.

4. The process of producing expanded rubber material which consists in placing the dough within a container, placing the container and dough within a gassing chamber, injecting gas under high pressure into the chamber, heating the cylinder to effect partial vulcanization of the dough, cooling the chamber, releasing the pressure, removing the dough from the container and chamber whereupon it expands, and finally completing vulcanization and simultaneously expanding the dough by reheating it.

5. The process of producing expanded rubber material which consists in placing the dough within a container, placing the container and dough within a gassing chamber, injecting gas under high pressure into the chamber, heating the cylinder to effect partial vulcanization of the dough, cooling the chamber, releasing the pressure, removing the dough from the container and chamber whereupon it expands, placing the dough within a larger container, and heating the dough until its vulcanization is complete and until it has expanded to fill the said larger container.

6. The process of producing expanded rubber material which consists in subjecting dough to gas under high pressure, effecting partial vulcanization of the dough by heat whilst the dough is in the said gas under pressure, cooling the dough, releasing the pressure, placing the dough together with at least one further portion of dough—similarly partially vulcanized under pressure—in a container that is large enough to permit expansion of the portions of dough, and heating the said portions of dough so that they become expanded and pressed together and completely vulcanized and united together.

7. The process of producing expanded rubber material which consists in subjecting the dough to gas under high pressure, effecting partial vulcanization of the dough by heat whilst the dough is in the gas under pressure, cooling the dough, releasing the said pressure, permitting further expansion of the dough, placing the dough together with at least one other similarly treated portion of dough (i. e. partially vulcanized and partially expanded) in a container large enough to permit further expansion of the portions of dough, and heating the portions of dough so that they are expanded within the container and completely vulcanized.

8. The process of producing expanded rubber material which consists in placing the dough within a container, placing the container and dough within a gassing chamber, injecting gas under high pressure into the chamber, heating the cylinder to effect partial vulcanization of the dough, cooling the chamber, releasing the pressure, removing the dough from the container and chamber whereupon it expands, placing the dough together with at least one similarly prepared portion of dough within a container large enough to permit further expansion of the portions of dough, and heating the said portions of dough so that they become expanded and pressed together and completely vulcanized and united together.

9. The process of producing expanded rubber material which consists in forming innumerable gas cells in the dough by subjecting it to gas under pressure, releasing the pressure from the dough, permitting the dough to expand under the action of the gas in the cells within it, and heating the dough to expand the gases within it and consequently also expanding the dough and simultaneously carrying vulcanization of the material to completion.

10. The process as in claim 9 wherein the dough is partially vulcanized by heat whilst subjected to gas under pressure.

11. The process of producing expanded rubber material which consists in rolling up a strip of dough, binding the dough to prevent unrolling, effecting partial vulcanization of the roll by heat, simultaneously subjecting the roll to gas under pressure, cooling the roll and releasing the pressure, removing the binding to permit expansion of the dough, and finally effecting complete vulcanization of the dough by heat which simultaneously further expands the dough.

GEOFFREY PRICE DENTON.